United States Patent
Ruf et al.

(10) Patent No.: US 11,890,916 B2
(45) Date of Patent: Feb. 6, 2024

(54) DEVICE AND METHOD FOR RAISING A TEMPERATURE IN AT LEAST ONE PORTION OF A VEHICLE

(71) Applicant: Audi AG, Ingolstadt (DE)

(72) Inventors: Markus Ruf, Waldstetten (DE); Kai Müller, Bretzfeld (DE)

(73) Assignee: AUDI AG, Ingolstadt (DE)

( * ) Notice: Subject to any disclaimer, the term of this patent is extended or adjusted under 35 U.S.C. 154(b) by 435 days.

(21) Appl. No.: 17/263,497

(22) PCT Filed: May 10, 2019

(86) PCT No.: PCT/EP2019/062006
§ 371 (c)(1),
(2) Date: Jan. 26, 2021

(87) PCT Pub. No.: WO2020/020501
PCT Pub. Date: Jan. 30, 2020

(65) Prior Publication Data
US 2021/0170831 A1 Jun. 10, 2021

(30) Foreign Application Priority Data
Jul. 27, 2018 (DE) ............... 10 2018 212 537.6

(51) Int. Cl.
*B60H 1/14* (2006.01)
*B60H 1/22* (2006.01)

(52) U.S. Cl.
CPC ..... *B60H 1/143* (2013.01); *B60H 2001/2228* (2013.01); *B60H 2001/2268* (2013.01)

(58) Field of Classification Search
CPC ............ B60H 1/143; B60H 2001/2228; B60H 2001/2268; H01M 8/04007; H01M 2220/20; H01M 2250/20; H01M 10/667; Y02E 60/10; Y02E 60/50; Y02T 90/40
See application file for complete search history.

(56) References Cited

U.S. PATENT DOCUMENTS

2015/0160704 A1* 6/2015 Benoit ................. G06F 1/206
361/679.54

FOREIGN PATENT DOCUMENTS

| CN | 108987852 A | * | 12/2018 | ............. B60L 58/27 |
|----|---|---|---|---|
| DE | 196 49 710 A1 | | 6/1998 | |
| DE | 10 2005 056 046 A1 | | 6/2007 | |
| DE | 10 2009 005 638 A1 | | 7/2010 | |
| DE | 102010045619 A1 | * | 3/2012 | ............... B62D 5/04 |
| DE | 10 2011 076 897 A1 | | 5/2012 | |
| DE | 102011076897 A1 | * | 5/2012 | ......... B60H 1/00385 |

(Continued)

*Primary Examiner* — Emmanuel E Duke
(74) *Attorney, Agent, or Firm* — Seed IP Law Group LLP

(57) ABSTRACT

A device for raising a temperature in at least one portion of a vehicle from a low temperature value to a temperature value increased above this, has at least one electronic component producing waste heat. The at least one electronic component is formed as a processor. Furthermore, a controller is provided, being designed to command the processor to provide a computing capacity in a heating mode, and to supply the waste heat generated upon performing at least one computation of the processor to the at least one portion of the vehicle. The disclosure furthermore relates to a method for raising a temperature of at least one portion of a vehicle from a low temperature value to a temperature value increased above this.

10 Claims, 1 Drawing Sheet

(56) References Cited

FOREIGN PATENT DOCUMENTS

| | | | |
|---|---|---|---|
| DE | 10 2011 090 125 A1 | 1/2013 | |
| DE | 10 2014 112 201 A1 | 3/2016 | |
| DE | 102014112201 A1 * | 3/2016 | ............ B60H 1/143 |
| DE | 10 2017 200 088 A1 | 7/2018 | |
| EP | 2 058 724 A2 | 5/2009 | |
| KR | 20090039975 A * | 4/2009 | ............ H01M 8/04 |
| TW | M513981 U * | 12/2015 | |

\* cited by examiner

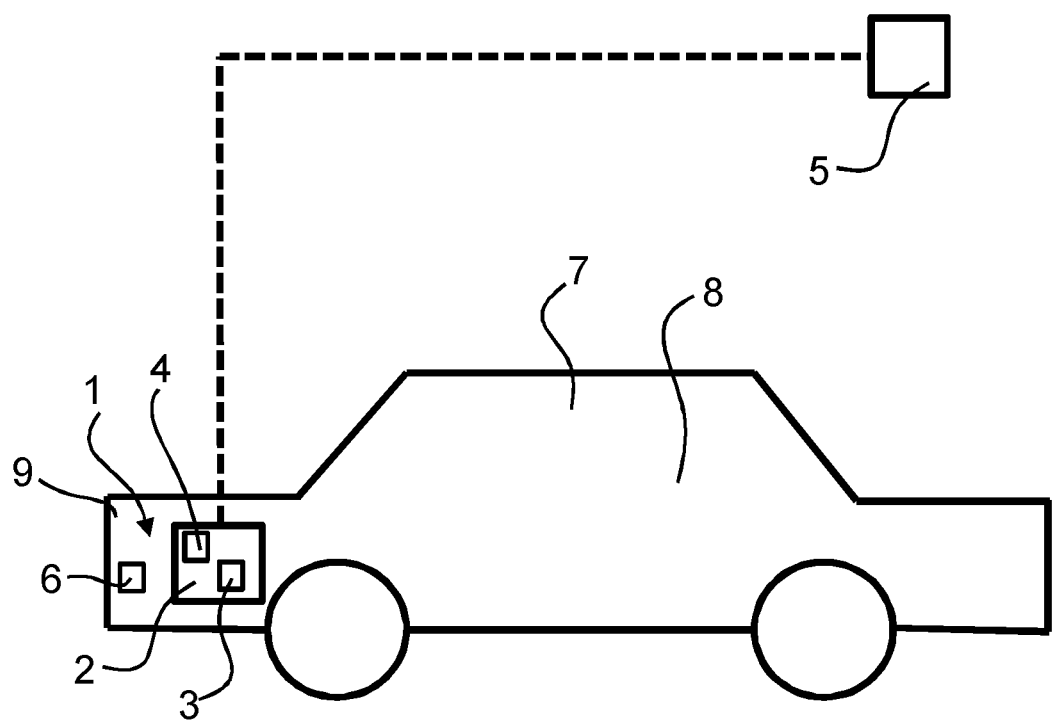

DEVICE AND METHOD FOR RAISING A TEMPERATURE IN AT LEAST ONE PORTION OF A VEHICLE

BACKGROUND

Technical Field

Embodiments of the invention relate to a device for raising a temperature in at least one portion of a vehicle from a low temperature value to a temperature value increased above this, having at least one electronic component producing waste heat.

Embodiments of the invention furthermore relate to a method for raising a temperature of at least one portion of a vehicle from a low temperature value to a temperature value increased above this.

Description of the Related Art

DE 10 2011 076 897 A1 shows a temperature regulating device for a vehicle. This uses the waste heat generated by electrical devices to improve the performance of the air conditioning of vehicles with a heat pump.

At the same time, the providing of increasingly greater computing capacity and computing performance is needed for example in the fields of crypto currencies or blockchain, in the economy, science, or development.

BRIEF SUMMARY

Therefore, embodiments of the present invention include a device and a method of the kind mentioned above so that at least one portion of a vehicle can be heated effectively and at the same time computing capacity is made available.

In some embodiments, at least one electronic component is formed as a processor, and a controller is provided, being designed to command the processor to provide a computing capacity in a heating mode, and to supply the waste heat generated upon performing at least one computation of the processor to the at least one portion of the vehicle.

On the one hand, this enables an increased computing capacity, as processors located in vehicles can be used to perform computations, and at the same time the waste heat generated in this way is used for heating the vehicle. The device may be arranged in a vehicle, where the vehicle may be a vehicle operated by a fuel cell or also a vehicle operated with an internal combustion engine. Alternatively, vehicles driven by electric motor or hybrid vehicles may also come under consideration. The controller may be associated with the processor itself or be integrated in a control device of the vehicle. The computations performed by the processor may be computations in the area of crypto currencies, and therefore computations of a blockchain. Alternatively, computations are performed in the area of science, economy, or in the medical field.

The waste heat can be supplied to a vehicle interior and/or an engine compartment. Thus, the raising of the temperature may occur within the vehicle interior and/or within the engine compartment. Heating of the engine compartment may be advantageous, for example, in the case of vehicles driven by fuel cell. It may be preferable for the processor to be situated in the engine compartment, next to or in proximity to a fuel cell stack. The waste heat generated by the processor can thus be utilized, for example, to pre-warm the fuel cell stack, for example during a cold start.

In order to receive computing tasks or data externally, i.e., from outside the vehicle, and to send already computed results of computing tasks to the task initiators, the processor may be associated with a sending and receiving unit for receiving data and/or computing tasks and for sending of results of the computing tasks.

In this regard, the processor may be in wireless or wired communication by means of the sending and receiving unit with at least one further external processor, and the processor forms with the at least one external processor a distributed system for the joint computing of computing tasks. This makes it possible to integrate the processor in a distributed system, so that computing tasks requiring a very large computing capacity are performed jointly with the one or more external processors of the distributed system by bundling the computing performance. In particular, a plurality of processors may be connected in communication to form a distributed system. Alternatively or additionally, the device itself comprises a plurality of processors which is or can be connected to each other in wireless or wired communication. This makes it possible to perform multiple or rather complex computations within the device, or to perform a computation jointly when large computing capacity is required. In this context, it is of course also possible that the plurality of processors is or can be connected wirelessly with at least one external processor to form a distributed system.

In order to also heat at least the one portion of the vehicle when no computing tasks are being performed, at least one heating element may be provided and the controller may be designed to switch between the heating mode and a second heating mode, wherein heat generated by the heating element can be supplied in the second heating mode to the at least one portion of the vehicle. The heating element may be formed as a heat pump, but it may also be formed as another electronic component, such as a resistor, or a motor or a compressor. The heating element may also be adapted to raise the temperature in another portion of the vehicle from a lower temperature value to a temperature value increased above this. For example, the waste heat of the processor could be furnished to the engine compartment and the heat generated by the heating element to the vehicle interior, or vice versa. The at least one heating element and/or the processor can be operated by means of a battery or by means of a fuel cell.

In some embodiments, a method for raising a temperature of at least one portion of a vehicle from a low temperature value to a temperature value increased above this, the vehicle having a processor, comprises the following steps: adjusting a heating mode, in which a controller commands the processor to provide a computing capacity and in which the waste heat generated upon performing at least one computation by the processor is supplied to the vehicle, thereby raising the temperature to an increased temperature value. The method makes it possible to provide computing capacity and at the same time to utilize the waste heat generated during the performing of computations for the heating of a vehicle or a portion thereof, especially of a vehicle interior or an engine compartment.

Furthermore, the method may involve the step of computing of data or performing of computing tasks which were received by means of a sending and receiving unit. The results obtained during the computation or the performance are then further passed on by means of the sending and receiving unit or returned to the task initiator. This makes it possible to also accept computing tasks from the outside, such as a server outside the vehicle, and to receive the corresponding data and send the data back after further processing.

In order to perform computations requiring a high computing capacity or high computing performance, the method furthermore comprises the step of the processor being wirelessly connected with at least one external processor to form a distributed system and providing its computing capacity within the distributed system for the joint computing of at least one computing task. Alternatively or additionally, a plurality of processors may also be provided in the vehicle, the plurality of processors being connected in wireless or wired communication with an internal network in order to provide its computing capacity within the internal network for the joint computing of at least one computing task or for the parallel performing of computing tasks.

In order to be able to heat the at least one portion of the vehicle even without the processor or to ensure that the vehicle can also be heated when the processor is not performing any computations, it is provided that the controller switches between the heating mode and a second heating mode, wherein the heat generated by the operation of a heating element situated in the vehicle is supplied in the second heating mode in or to the at least one portion of the vehicle.

Alternatively or additionally, the controller can also switch to a third heating mode, in which both the waste heat generated by the processor when performing computations and the heat generated in the operation of a heating element are supplied or conducted to the at least one portion of the vehicle. Alternatively, the waste heat generated by the processor can be supplied to a first portion of the vehicle and the heat generated by the heating element can be supplied to a second, different portion of the vehicle.

BRIEF DESCRIPTION OF THE SEVERAL VIEWS OF THE DRAWINGS

Further benefits, features and details are presented in the claims, the following description, and the drawing.

FIG. 1 illustrates a schematic representation of a vehicle with a device as described herein.

DETAILED DESCRIPTION

FIG. 1 shows a vehicle 7 with a device 1 for raising a temperature in at least one portion of the vehicle 7 from a low temperature value to a temperature value increased above this. The device 1 comprises at least one electronic component, formed as a processor 2, and a controller 3. The controller 3 is adapted to command the processor 2 to provide computing capacity in a first heating mode. The waste heat generated during the performing of at least one computation by the processor 2 is then supplied to the at least one portion of the vehicle 7. The temperature may be supplied to a vehicle interior 8 and/or to the engine compartment 9. The waste heat can be supplied to the at least one portion of the vehicle 7 by at least one conduit.

The processor 2 comprises a sending and receiving unit 4, or such a unit is associated with the processor 2. This serves for receiving of data and/or computing tasks, for example from an external server. Moreover, it serves for sending the results of computing tasks performed or worked off by the processor 2, for example to the external server.

In particular, the processor 2 can be used to be connected in wireless communication by means of the sending and receiving unit 4 with at least one external processor 5. In this way, the processor 2 with the at least one external processor 5 forms a distributed system for the joint computing of computing tasks.

Furthermore, the device 1 comprises at least one heating element 6. This heating element 6 may be formed as a heat pump or another electronic component, such as a resistor, or a motor, or a compressor. The controller 3 is adapted to switch between the above described heating mode and a second heating mode, wherein the heat generated by the heating element 6 is supplied in the second heating mode to the at least one portion of the vehicle 7. The at least one heating element 6 and/or the at least one processor 2 can be operated by means of a battery or by means of a fuel cell. In a fuel cell driven vehicle 7, the device 1 and therefore also the processor 2 may be arranged next to or in spatial proximity to a fuel cell stack.

A method may proceed as follows:

a control unit of the vehicle 7 receives the command to raise the temperature in at least one portion of the vehicle 7 from a low temperature value to a temperature value increased above this. Furthermore, the control unit receives the command as to whether the heating of the at least one portion of the vehicle 7 should occur by means of the heating mode, i.e., by means of the waste heat generated by means of the processor 2, or by means of the heat generated by the heating element 6 in the second heating mode, or by means of a third heating mode, in which both the processor 2 and the heating element 6 are active for generating heat. The controller 3 selects the corresponding heating mode (first, second, or third heating mode) in dependence on the command or control signal relayed by the control unit.

If it switches to the (first) heating mode or to the third heating mode, the controller 3 determines whether there are still computing tasks to be worked off in the processor 2. If so, the controller 3 commands the processor 2 to determine whether sufficient computing capacity is available for an upcoming (further) computing task. If sufficient computing capacity is not available, the processor 2 will be commanded by the controller 3 to provide computing power.

If no computing tasks are being worked off in the processor 2, the processor 2 (or the controller 3) connects to a data storage medium or a server by means of the sending and receiving unit 4. This may be done wirelessly, for example, with an external server/network, in order to accept or receive computing tasks. Alternatively or additionally, the processor 2 may connect wirelessly to the at least one external processor 5. The processor 2 and the external processor 5 then form a distributed system and can jointly perform a computing task.

When the increased temperature value is attained, the controller 3 commands an interruption of the computing or the computing task in the heating mode or in the third heating mode. This may be continued at a later time. If the computations or computing tasks are finished, the obtained result may be sent in turn by the sending and receiving unit to the external server or also to the external processor 5 for further processing.

If no computing tasks are available or if the second heating mode has been selected, the controller 3 switches to the second heating mode and commands the heating element 6 to generate the required heat, and the heat generated by the heating element 6 is supplied to the at least one portion of the vehicle 7.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A device for raising a temperature in at least one portion of a vehicle from a low temperature value to a higher temperature value above the low temperature value, the device comprising: at least one electronic component, the at least one electronic component including a processor; and a controller adapted to command the processor of the at least one electronic component to perform computing tasks not related to operation of the vehicle, wherein the processor produces waste heat while performing the computing tasks, and to supply the waste heat produced upon performing the computing tasks to the at least one portion of the vehicle.

2. The device according to claim 1, further comprising a communications unit.

3. The device according to claim 2, wherein the processor is in wireless or wired communication by the sending and receiving unit with at least one external processor, and the processor forms with the at least one external processor a distributed system for the joint computing of computing tasks.

4. The device according to claim 1, wherein at least one heating element is provided and heat generated by the heating element is supplied to the at least one portion of the vehicle.

5. The device according to claim 4, wherein the at least one heating element and/or the processor is operable by a battery or a fuel cell.

6. A method for raising a temperature of at least one portion of a vehicle from a low temperature value to a higher temperature value above the low temperature value, the vehicle having a processor, the method comprising:
a controller commanding the processor to perform computing tasks not related to operation of the vehicle; and
supplying waste heat generated by the processor upon performing the computing tasks to the vehicle, thereby raising the temperature to the higher temperature value.

7. The method according to claim 6, wherein data for the computing tasks is received by a communications unit, and results from the computing tasks are sent by the communications unit.

8. The method according to claim 7, wherein the processor is wirelessly connected with at least one external processor to form a distributed system and provides its computing capacity within the distributed system to the joint computing of at least one computing task.

9. The method according to claim 6, wherein heat generated by operation of a heating element situated in the vehicle is supplied to the at least one portion of the vehicle.

10. The method according to claim 9, wherein the waste heat generated by the processor when performing the computing tasks and the heat generated in the operation of a heating element are supplied to the at least one portion of the vehicle concurrently.

* * * * *